Sept. 29, 1964     H. H. EICKERMAN, SR     3,150,982
MEAT FLAVORING AND TENDERIZING DEVICE AND METHOD
Filed July 19, 1961     3 Sheets-Sheet 1

INVENTOR.
HERMAN H. EICKERMAN, SR.
BY Bielor & Schlemmer

ATTORNEYS

Sept. 29, 1964 H. H. EICKERMAN, SR 3,150,982
MEAT FLAVORING AND TENDERIZING DEVICE AND METHOD
Filed July 19, 1961 3 Sheets-Sheet 2
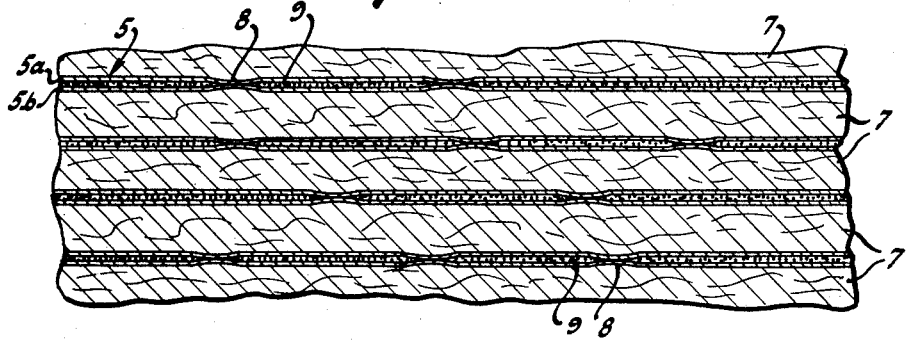
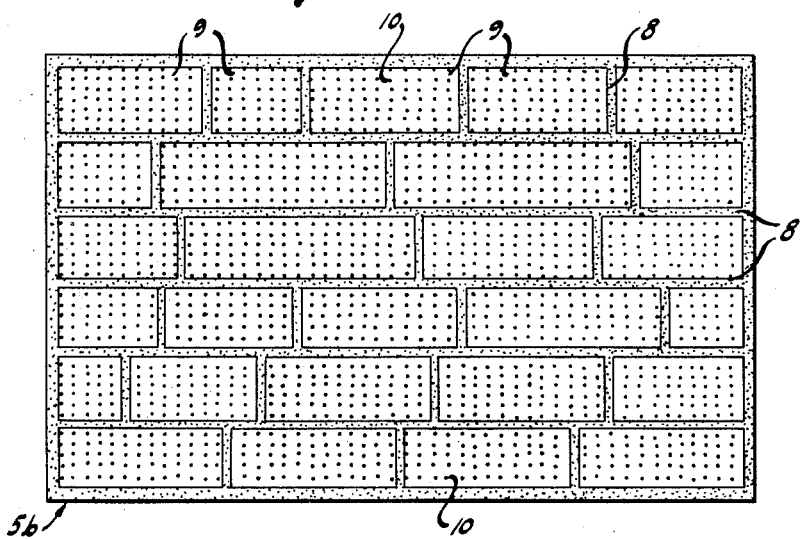
INVENTOR.
HERMAN H. EICKERMAN, SR.
BY Bialos & Schlemmer
ATTORNEYS Sept. 29, 1964   H. H. EICKERMAN, SR   3,150,982
MEAT FLAVORING AND TENDERIZING DEVICE AND METHOD
Filed July 19, 1961   3 Sheets-Sheet 3

INVENTOR.
HERMAN H. EICKERMAN, SR
BY
ATTORNEYS

३,१५०,९८२
MEAT FLAVORING AND TENDERIZING
DEVICE AND METHOD
Herman H. Eickerman, Sr., N. 119 Washington St.,
Spokane, Wash.
Filed July 19, 1961, Ser. No. 125,248
4 Claims. (Cl. 99—107)

The present invention relates to a means for flavoring and tenderizing slices of meat; this application being a continuation in part of applicant's copending application, Serial No. 605,151, filed August 20, 1956, now abandoned. It has been known that meats may be rendered tender and more easily assimilated by applying a solution of certain proteolytic enzymes, such as papain (papayotin). Likewise, flavoring such as salt and various spices have been applied to meats by using a cloth or fiber wet with the solution on and between pieces of meat.

It is the purpose of the invention to provide a simple means by which such substances as salt, spices such as pepper, and particularly tenderizer proteolytic enzymes such as pepsin, rennin, and desirably papain, can be applied in dry form to slices of meat in a simple, convenient manner without wetting the meat.

The nature and advantages of the invention will appear more fully from the following description and the accompanying drawings illustrating particular embodiments of the invention. The drawings and description are illustrative only, however, and are not intended to limit the invention except insofar as it is limited by the claims.

In the drawings:

FIG. 3 is a fragmentary sectional view through a plurality of slices of meat being treated;

FIG. 4 is a plan view illustrating the interior face of a sheet prepared for making the treating device;

Figure 1:
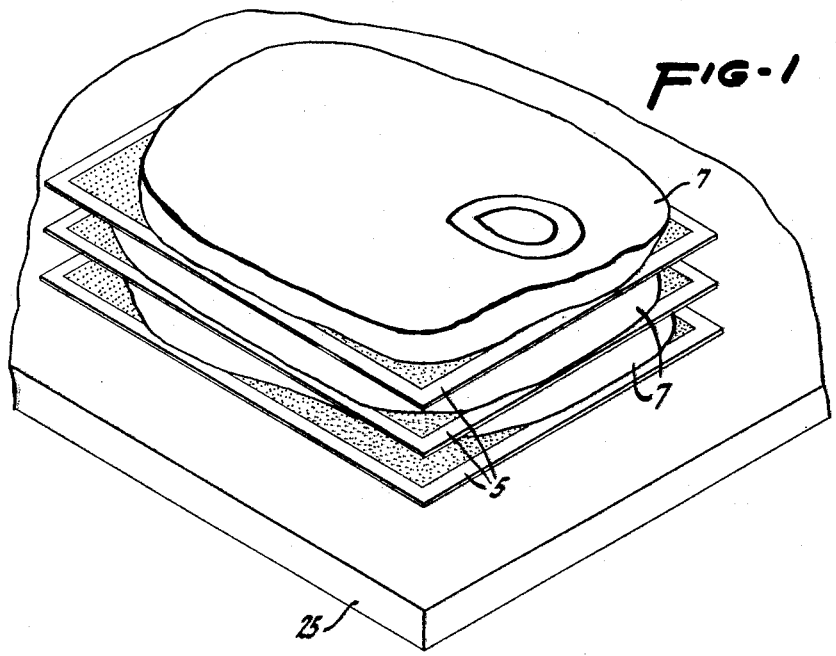
FIG. 1 is a somewhat diagrammatic perspective view of an embodiment of the invention showing a stack of steaks being treated by my invention.

The practice of the invention is best accomplished by application of the flavoring materials and tenderizers to the meat in relatively thin pieces; steaks, chops and ground patties are all thin enough. Yet to dip these in a liquid solution or to brush or paint on a wet composition containing the desired materials is extremely costly and rather messy too. Moreover, treatment with solutions, such as aqueous solutions, results in incorporation of excess moisture to the meat. It has been proposed to use wet cloths which have the flavoring materials in solution and to place these cloths between layers of meat. This system, however, is rather bad. It requires the difficult handling of wet cloths and also adds an excess of moisture to the meats.

I have discovered that I can effectively apply the proteolytic enzyme tenderizer papain, which is soluble in the meat, and flavoring materials, which are soluble in meat juices, such as salt, pepper and other spices very effectively without using any solution whatsoever. I accomplish this by preparing the materials in a dry, granular, or particle form, and then placing them on a carrier sheet in the form of an envelope 5 of paper so constructed as to keep the materials 6 dispersed throughout the area of the envelope. The envelope is perforated with a multiplicity of fine apertures 10 which are so small as to retain the materials within the envelope during handling of the envelopes up to the time of their use. The envelopes 5 are laid between slices 7 of the meat to be treated. I find that the apertures 10 expose the papain to the meat slices and the juices of the meat will penetrate into the envelope through the openings 10 and thus establish a fluid carrier to dissolve and carry the desired flavoring and tenderizing materials into the meat.

As illustrated in the drawings, the envelope 5 is made up of two sheets 5a and 5b of paper or its equivalent. A high wet strength paper is used and it should have low absorption characteristics because otherwise the paper will absorb a substantial amount of liquid from the meat, and thus some of the papain will become absorbed in the paper. Paper having these characteristics is known in the industry. So called butcher paper commonly employed in the wrapping of meats is suitable. The sheets 5a and 5b are joined together along a multiplicity of crossing lines 8 throughout their extent so as to divide the space between the sheets into a larger number of small pockets 9 in which the dry granular materials 6 are confined. The sheets 5a and 5b are provided between the lines with a multiplicity of tiny apertures 10. These apertures 10 provide passages for the meat juices to dissolve and absorb the flavoring and tenderizing materials in the pockets. The juices act as a carrier so that the dissolved materials work out into the meat and perform their intended function.

Figure 2:
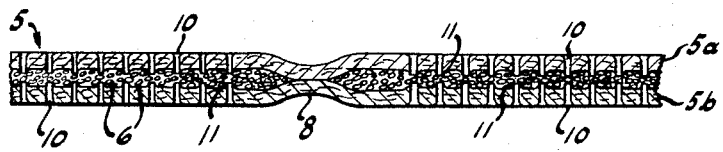
FIG. 2 is a fragmentary cross-section on an enlarged scale through the meat treating device.

The apertures 10 preferably are formed by pricking the sheet material with small pins so that the paper around each aperture is raised slightly on one face as indicated at 11 in FIG. 2. This face is placed on the inside of the envelope 5 so that the raised portions 11 act as barriers to keep the dry materials from escaping in the handling of the envelopes. Any suitable means may be used to cause the two sheets 5a and 5b to stick together along the lines 8 and form the pockets 9. As shown in FIG. 4, adhesive is applied along the lines 8 after which the sheets are pressed together. The materials 6 are placed on the lower sheet before the top sheet is put in place.

With my invention the meat cutter, in filling an order that desires the flavoring and tenderizer, cuts the steaks, chops, etc. and places an envelope as a sheet beneath and over each piece, whereby the sheets carrying the dry papain are interposed between the respective slices of meat. The meat juices will then gradually extract the material 6 through the apertures 10 and dissolve the material exposed at opposite sides of each sheet through such apertures. Thus, the treating of the meat is accomplished merely by applying the previously prepared envelope sheets carrying the dry tenderizer material, desirably papain, and keeping them in place in contact with the slices of meat for the period of time necessary to disperse the material through the meat.

Figure 5:
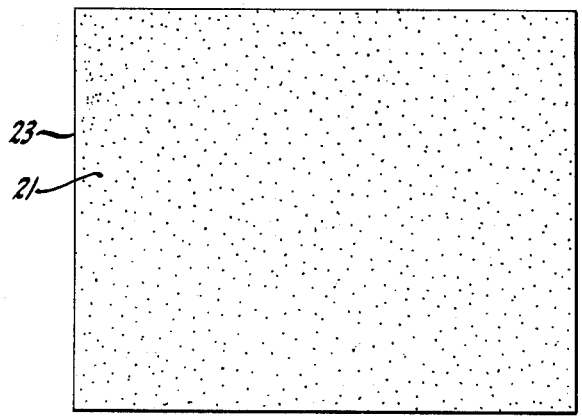
FIG. 5 is a plan view of another embodiment of the invention, which has been found desirable.
Figure 6:
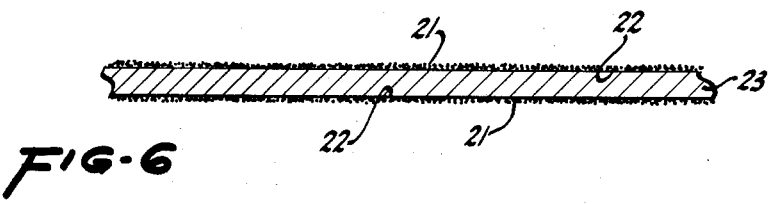
FIG. 6 is an enlarged fragmentary cross-sectional view of the embodiment of FIG. 5.
Figure 7:
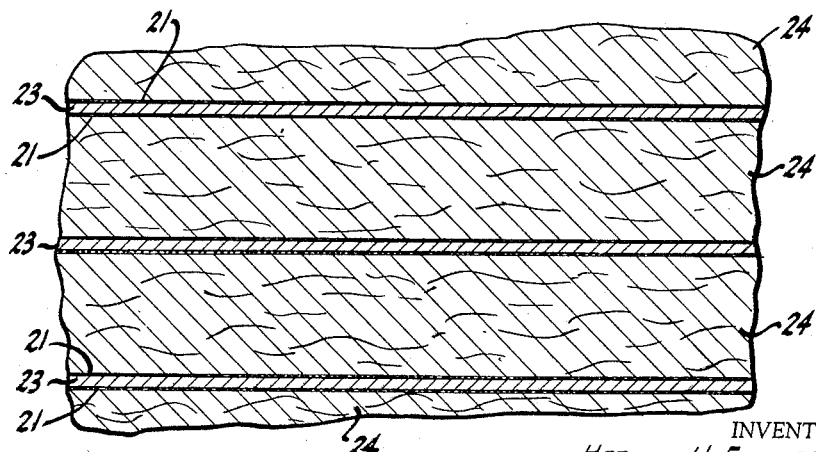
FIG. 7 is an enlarged fragmentary sectional view through a plurality of meat slices being treated with the embodiment of FIGS. 5 and 6.

FIGS. 5 through 7 illustrate a desirable and preferred embodiment of the invention wherein dry particles 21 of the tenderizing proteolytic enzyme, desirably papain, are carried uniformly on the opposite sides or faces 22 of a single sheet of paper 23 whereby the papain particles are directly exposed to meat slices 24 when individual sheets 23 are interleaved between adjacent slices of the meat in the manner illustrated by FIG. 7. The paper is of the same type previously described, namely, one which has relatively low moisture absorption properties. Most suitable for this purpose is the commercially well known dry waxed type of paper. Such paper is one in which the wax, usually any suitable paraffin or microcrystalline wax or mixtures thereof, is impregnated in or in other words entirely within the body of the paper without formation of a wax surface coating on the paper.

As is well known in the paper art, dry waxed paper is prepared by continuously passing a sheet of the paper through a bath of molten wax, such as paraffin wax; and as it comes out of the bath, both surfaces or sides of the sheet are scraped with a doctor roll or blade to remove excess surface wax and thus obviate formation of a wax coating on such paper sides. The sheets thus impregnated with wax is then rewound in a roll while the sheet is still warm, at a temperature of about 170° to 180° F. Application of the papain to the dry waxed sheet is readily effected by dusting papain granules or powder from a dispenser uniformly over each side of sheet, as the sheet is moved uniformly by a dispenser. The papain granules have sufficient inherent tackiness to stick to the sides of the sheet; and in this connection, a relatively small amount of the papain, as is disclosed hereinafter, is applied. Thus, there is no substantial amount of excess papain applied that may not stick to the sheet.

It is important that there not be a substantial amount of wax coating on the sheet but that the wax be substantially all impregnated in the sheet, because when the sheets are interleaved between the meat slices, it is desirable that air be able to wick through the sheets from their exposed side edges, so that the stacked slices are subjected to oxygen which escapes from the surfaces of the sheet. This preserves the bloom of the meat, or in other words, the meat remains pink or red. Without such wicking of oxygen through the sheets, which might otherwise occur if the sheets are wax coated, the meat may turn dark. For the same reason, the sheets should have sufficient thickness, maintaining the meat slices completely separated by the respective sheets and thus allow all parts of the adjacent surfaces of the meat slices to be subjected to the wicked oxygen.

Any type of relatively non-absorbent paper can be employed impregnated desirably with wax, or any other well known type of moisture resistant sizing agent, such as casein, starch or resin which impart wet strength to the paper. Most suitable for the purposes of the invention is dry waxed kraft paper of a weight of about 25 to 37 lbs. per ream (3000 sq. ft.) having a caliper of about 0.020 to 0.030 inch, and which is impregnated with paraffin wax in an amount of about 3½ to 8 lbs. per ream, although such range is not particularly critical as long as the paper is not too heavily impregnated with the sizing agent which would interfere with the aforementioned air wicking action, and is not too thin and is relatively non-absorbent.

If the sheet is relatively moisture absorbent, it will draw out liquid from the meat, thus causing the meat to dry out and retard the tenderizing action of the papain. Also, effect of the papain is lessened because the absorbed moisture in the paper dissolves the papain which works into the paper instead of into the meat. The preferred paper is about 30 lb. kraft impregnated with about 5 lbs. of wax per ream having a caliper of about 0.025 inch.

The amount of exposed papain particles carried by each side or surface of the sheet is, however, critical. Too much papain on each side will digest the meat and thus break it down while too small an amount will not have a material tenderizing effect on the meat. If the amount of papain on each side is materially in excess of about 0.7 lb. per ream, break down of the meat is quite apt to occur while below 0.25 lb. of papain on each side will not provide sufficient effect on the meat. About 0.4 lb. of papain on each side of the sheet per ream (0.8 lb.) both sides has been found to produce optimum effects.

Thus, the following example is illustrative of a particular embodiment of the invention illustrated by FIGS. 5 through 7:

| | |
|---|---|
| Paper | Kraft |
| Weight per ream (3000 sq. ft.) _____lbs__ | 30 |
| Paraffin wax impregnation per ream _____lbs__ | 5 |
| Amount of exposed papain uniformly over each side per ream _____lb__ | 0.4 |

Desirably, the dry waxed, papain carrying sheets are sold to the user in two sizes, namely, 9 x 12 and 9 x 27 inches.

From the preceding, it is seen that in both the described embodiments of the invention, the papain carrying paper sheets provide a dry system to obtain maximum effect of the papain on the meat when the sheets are interleaved between the slices thereof, without drying out the meat, and at the same time allowing air to wick through the sheets to maintain the bloom of the meat slices.

To insure that the sheets are dry until they are used, it is desirable that they be bundled in wrappers of moisture impermeable material, such as polyethylene film, to preclude moisture pickup due to the hydroscopic properties of the papain. Also, such mode of packing precludes moisture absorption that might otherwise occur in hot humid climates.

An advantageous manner of tenderizing freshly cut meat slices by the interleaving method hereof is to allow a stack of such interleaved slices to stand while supported on a tray, at about room temperature for about 1½ to 2½ hrs., desirably about 2 hrs., and then place the interleaved stack in the usual cooling cabinet until it is ready for distribution to the meat market for sale. The interleaved paper is usually removed at the market.

I claim:

1. A meat flavoring and tenderizing device comprising an envelope for insertion between slices of meat, said envelope being made up of two thin paper sheets joined to each other to provide a plurality of pockets between said sheets, flavoring and tenderizing materials including papain which are soluble in meat juices being disposed in dry granular form in said pockets, said sheets having a multiplicity of apertures leading through the sheets to the pockets, the apertures being small enough to retain the dry materials in the pockets, but passing meat juices to dissolve the materials whereby the flavoring and tenderizing materials including the papain are brought into contact with the meat to produce a flavoring and tenderizing thereof.

2. The method of treating meat to tenderize the same which comprises providing the meat in the form of individual pieces, providing a plurality of paper sheets, each sheet being impregnated with a sizing agent imparting relatively low moisture absorption characteristics to said sheet, the surfaces of each sheet being substantially free of a coating of said sizing agent whereby air can wick through the sheet from its side edges when the sheet is between pieces of meat in a stack, each sheet carrying an exposed dry proteolytic enzyme coating on a surface thereof uniformly distributed over such surface, and the amount of enzyme on such surface being about 0.25 to 0.7 lb. per ream of the paper, interleaving said enzyme carrying sheets between said individual meat pieces and forming a stack of said pieces to cause the meat juices to extract said enzyme from the sheets while simultaneously allowing air to wick through the sheets from the edges thereof to preserve the bloom of the meat.

3. A stack of individual meat pieces having between substantially all adjacent slices of the stack a sheet of paper impregnated with a sizing agent imparting relatively low moisture absorption characteristics to said sheet, the surfaces of the sheet being substantially free of a coating of said sizing agent whereby air can wick through the sheet from its side edges and preserve the bloom of the meat, each sheet carrying an exposed dry proteolytic enzyme coating on both surfaces uniformly distributed over such surfaces and directly in contact with a stacked meat piece, the amount of proteolytic enzyme on each surface being about 0.25 to 0.7 lb. per ream of the paper.

4. The stack of individual meat pieces of claim 3 wherein the sizing agent is wax, and the proteolytic enzyme is papain.

References Cited in the file of this patent
UNITED STATES PATENTS

| | | |
|---|---|---|
| 2,072,955 | Lunt | Mar. 9, 1937 |
| 2,811,454 | Pressman | Oct. 29, 1957 |
| 2,813,798 | Toby | Nov. 19, 1957 |